United States Patent [19]

Yamaguchi

[11] Patent Number: 5,107,162
[45] Date of Patent: Apr. 21, 1992

[54] ULTRASONIC MOTOR USING RECTANGULAR WAVE

[75] Inventor: Masaki Yamaguchi, Gifu, Japan

[73] Assignee: Brother Kogyo Kabushiki Kaisha, Nagoya, Japan

[21] Appl. No.: 630,248

[22] Filed: Dec. 19, 1990

[30] Foreign Application Priority Data

Feb. 28, 1990 [JP] Japan ............................... 2-48534

[51] Int. Cl.⁵ ............................................. H01L 41/08
[52] U.S. Cl. .................................. 310/317; 310/316; 310/323
[58] Field of Search ................ 310/316, 317, 323, 328

[56] References Cited

U.S. PATENT DOCUMENTS 4,933,590  6/1990  Inoue et al. ........................ 310/323

FOREIGN PATENT DOCUMENTS 0001486  1/1989  Japan ................................... 310/323
0051378  2/1990  Japan ................................... 310/323
0051379  2/1990  Japan ................................... 310/323

OTHER PUBLICATIONS

Japanese Journal of Applied Physics, vol. 28 (1989) Supplement 28-1, pp. 3-6.

Primary Examiner—Mark O. Budd
Attorney, Agent, or Firm—Oliff & Berridge

[57] ABSTRACT

An ultrasonic wave motor includes an elastic member, a movable member, a first electrical/mechanical energy converting member for applying to the elastic member a vibration in a moving direction of the movable member, a second electrical/mechanical energy converting member interposed between the elastic member and the movable member for applying to the movable member a vibration in a floating direction of the movable member, and a driving source for applying a rectangular wave excitation signal to the second electrical/mechanical energy converting member. With this construction, slippage between the movable member and the second electrical/mechanical energy converting member can be eliminated to thereby achieve efficient transmission of energy.

10 Claims, 5 Drawing Sheets

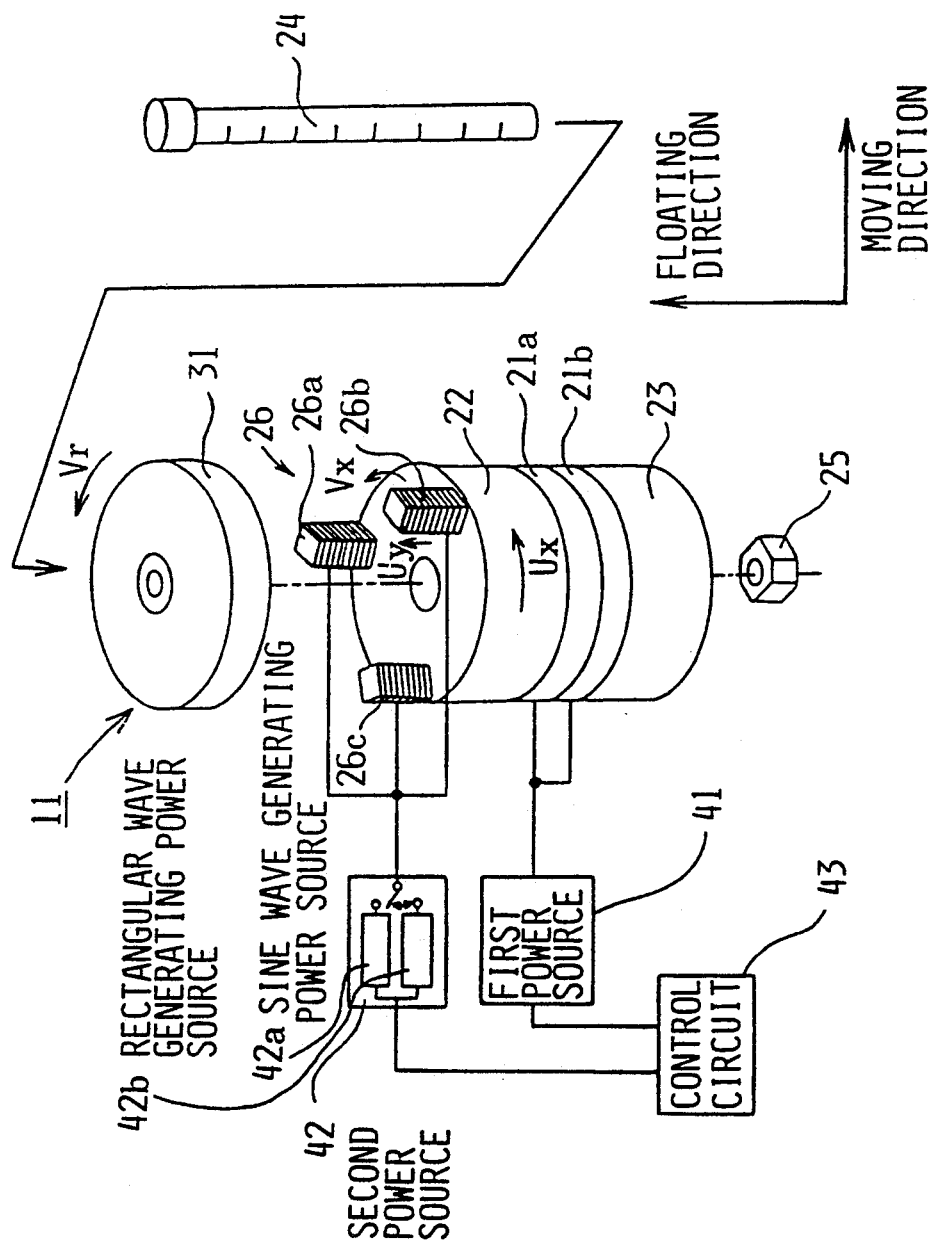

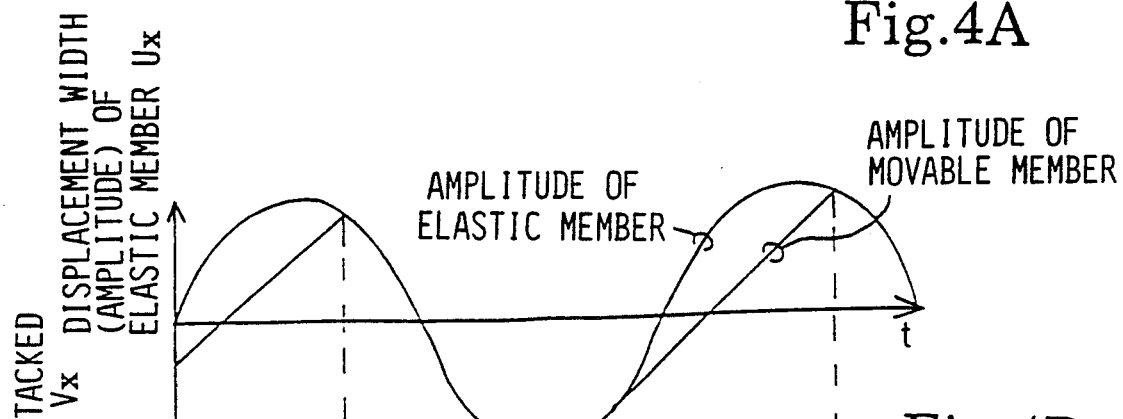
Fig.4A
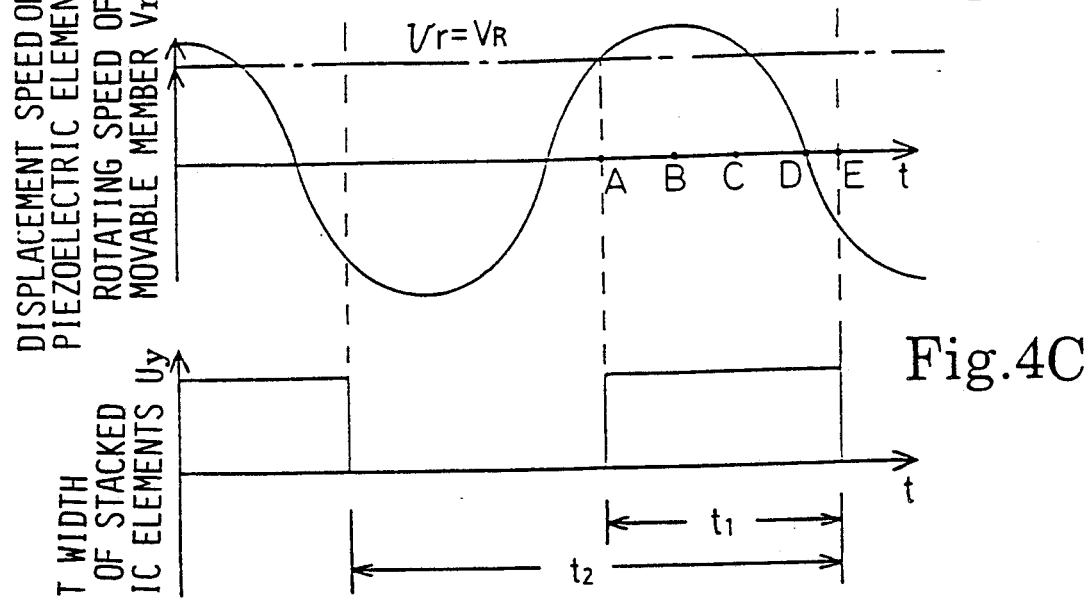
Fig.4B
Fig.4C

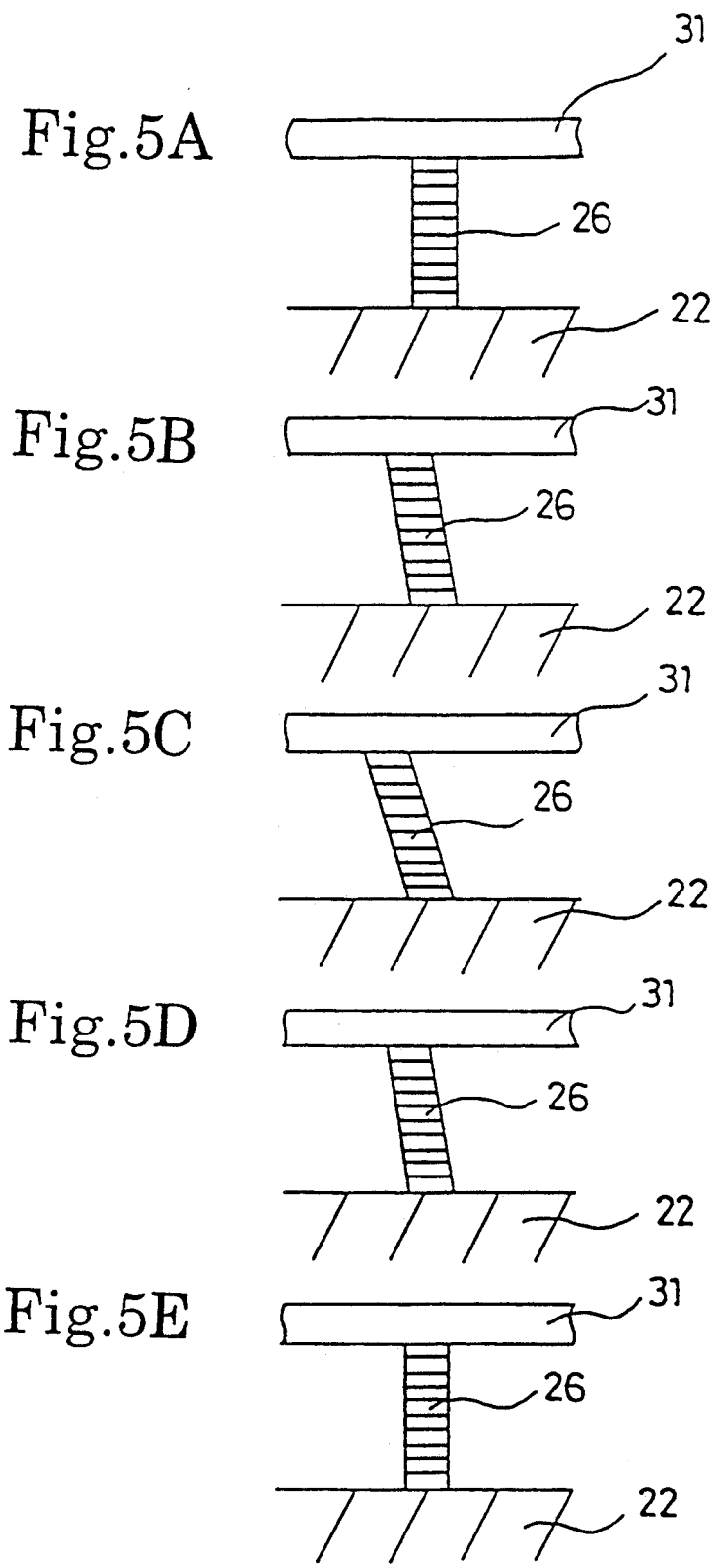

ULTRASONIC MOTOR USING RECTANGULAR WAVE

BACKGROUND OF THE INVENTION

1. Field of the Invention

The present invention relates to an ultrasonic wave motor, and more particularly to an ultrasonic wave motor utilizing a rectangular wave signal for producing vibrational energy as a driving source.

2. Description of the Related Art

The principle of operation of a generally known standing wave type ultrasonic wave motor is such that a movable member is contacted under a predetermined pressure by an ultrasonic wave vibrator adapted to be excited to generate a substantially elliptic vibration, and the movable member is driven by a frictional force between the same, with each material point of the ultrasonic wave vibrator generating a substantially elliptic vibration. Such a standing wave type ultrasonic wave motor can realize high efficiency and large output since a vibration of high efficiency can be easily realized.

It is known that a stacked piezoelectric element is used as an excitation source in a floating direction of the movable member in the ultrasonic wave motor. In this type of ultrasonic wave motor, an excitation signal having a frequency different from a natural vibration frequency of the movable member is applied to the stacked piezoelectric element to drive the movable member under a non-resonant condition. Therefore, it is superior in controllability to another type ultrasonic wave motor utilizing a resonant phenomenon of vibrations in two directions.

However, as a sine wave signal is used as the excitation signal to be applied to the stacked piezoelectric element, a vibration speed of the ultrasonic wave vibrator differs from a moving speed of the movable member during a large proportion of a contact time between the ultrasonic wave vibrator and the movable member. Accordingly, a shearing strain is generated in the ultrasonic wave vibrator, and as the shearing force is larger than the frictional force, slippage is generated between the frictional surfaces to cause a loss of energy.

SUMMARY OF THE INVENTION

Accordingly, it is an object of the present invention to overcome the above problems and to provide an ultrasonic wave motor which can greatly reduce the slippage between the frictional surfaces of the ultrasonic wave vibrator and the movable member to thereby realize high responsiveness and high efficiency.

The above and further objects and novel features of the invention will be achieved by an ultrasonic wave motor comprising (a) an elastic member; (b) a movable member; (c) a first electrical/mechanical energy converting member for applying to the elastic member a vibration in a moving direction of the movable member; (d) a second electrical/mechanical energy converting member interposed between the elastic member and the movable member for applying to the movable member a vibration in a floating direction of the movable member; and (e) a driving source comprising means for applying a rectangular wave excitation signal to the second electrical/mechanical energy converting member.

BRIEF DESCRIPTION OF THE DRAWINGS

The invention will be described in detail with reference to the following drawings, wherein:

FIG. 1 is a perspective view of the ultrasonic wave motor according to a preferred embodiment of the present invention;

FIGS. 4A, 4B and 4C are graphs showing the relationship among an amplitude Ux (FIG. 4A) of the elastic member in its circumferential direction (X-direction), an amplitude Uy (FIG. 4C) of the stacked piezoelectric elements in their stacked direction (Y-direction), a speed Vx (FIG. 4B) of the stacked piezoelectric elements in their circumferential direction (X-direction) and a rotating speed Vr (FIG. 4B) of the movable member; and FIGS. 5A to 5E are illustrations of the behavior of the stacked piezoelectric elements and the movable member on the frictional surfaces thereof.

DETAILED DESCRIPTION OF THE PREFERRED EMBODIMENTS

Figure 2A:
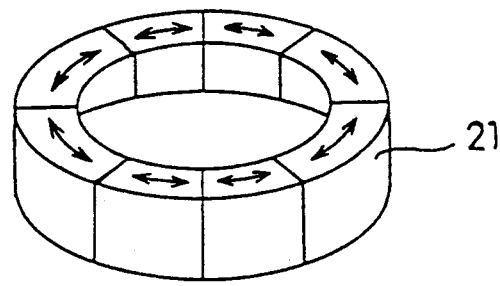
FIG. 2A is a perspective view of an annular piezoelectric element employed in the ultrasonic wave motor.
Figure 2B:
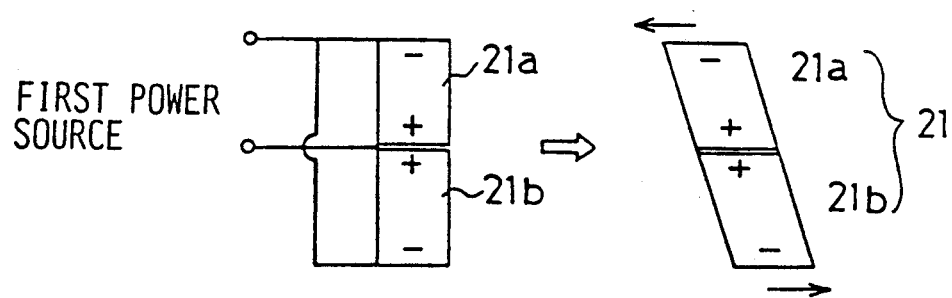
FIG. 2B is a schematic illustration of a shearing vibrational condition of the annular piezoelectric elements when sine waves of reverse phases are applied thereto.

A detailed description of one preferred embodiment of an ultrasonic wave motor embodying the present invention will now be given referring to the accompanying drawings. As shown in FIG. 1, an ultrasonic wave motor 11 includes a pair of annular piezoelectric elements 21a and 21b interposed between a pair of elastic members 22 and 23. As shown in FIG. 2A, each of the annular piezoelectric elements 21a and 21b is formed by annularly bonding eight divided pieces. Further, as shown in FIG. 2B, the annular piezoelectric elements 21a and 21b are arranged in such a manner that positive poles are opposed to each other and negative poles are positioned on the opposite sides. The annular piezoelectric elements 21a and 21b are electrically connected to a common sine wave AC power source (first power source) 41. Accordingly, the annular piezoelectric elements 21a and 21b are adapted to be excited to generate shearing vibrations having reverse phases. The elastic members 22 and 23 are formed of metal such as aluminum and brass or ceramic.

Three stacked piezoelectric elements 26 (26a, 26b and 26c) are disposed on an upper surface of the elastic member 22. The stacked piezoelectric elements 26a to 26c are electrically connected in parallel to a common second power source 42. The second power source 42 includes a sine wave generating power source 42a and a rectangular wave generating power source 42b, which are selectively connected to the stacked piezoelectric elements 26a to 26c. The first power source 41 and the second power source 42 are selectively actuated by a control circuit 43 during time periods described herein. A disk-shaped movable member 31 is disposed on the stacked piezoelectric elements 26a to 26c, and it is mechanically fixed with the elastic members 22 and 23 and the annular piezoelectric elements 21a and 21b by means of a bolt 24 and a nut 25.

The operation of the ultrasonic wave motor 11 mentioned above will now be described with reference to FIGS. 3 to 5.

Figure 3:
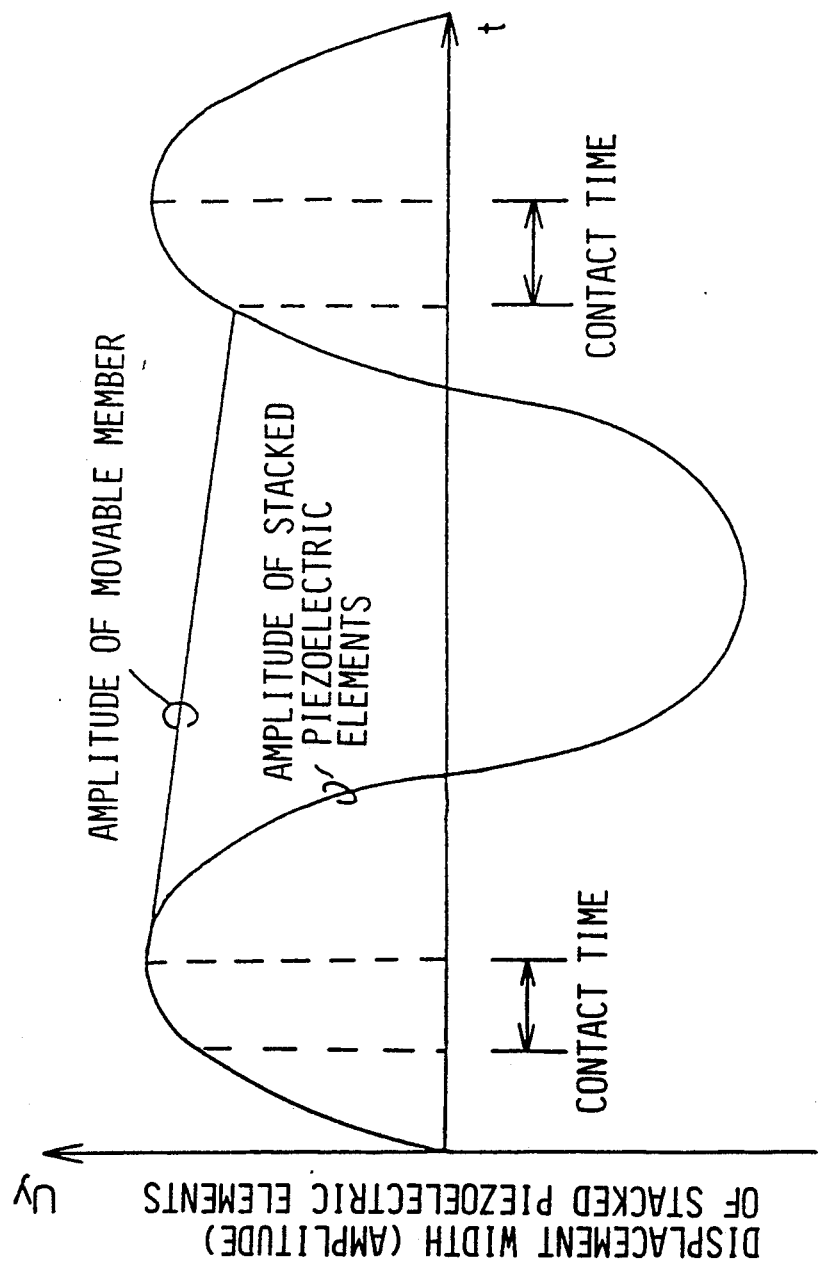
FIG. 3 is a graph showing an amplitude-time characteristic of the stacked piezoelectric elements and the movable member when a sine wave is applied to the stacked piezoelectric elements.

Referring to FIG. 3, when a sine wave is applied to the stacked piezoelectric elements 26, the stacked piezoelectric elements 26 are expanded and contracted in a stacked direction thereof to displace the movable member 31 in its floating direction. An amplitude of expansion and contraction of the stacked piezoelectric elements 26 depends proportionally on a magnitude of a sine wave AC voltage to be applied to the second power source 42. When the stacked piezoelectric elements 26 are contracted under the condition where they contact the movable member 31, the movable member 31 separates from the top surfaces of the stacked piezoelectric elements 26. Thereafter, while the movable member 31 is being lowered by gravity, the stacked piezoelectric elements 26 are expanded again to come into contact with the movable member 31 and thereby lift the movable member 31. In FIG. 3, an area shown by a dashed line denotes a contact condition of the stacked piezoelectric elements 26 with the movable member 31. Under the contact condition, a torque is transmitted from the elastic member 22 through the stacked piezoelectric elements 26 to the movable member 31.

First, a sine wave AC voltage having a resonance frequency f corresponding to a natural oscillation frequency of the elastic members 22 and 23 is applied from the first power source 41 to the piezoelectric elements 21a and 21b, so as to vibrate the piezoelectric elements 21a and 21b, so that a resonance vibration of a torsional vibration mode is generated in the elastic members 22 and 23. Then, the sine wave generating power source 42a is selected by the control circuit 43 to be connected to the stacked piezoelectric elements 26, so as to apply a sine wave AC voltage having a frequency f to the stacked piezoelectric elements 26 and thereby vibrate the stacked piezoelectric elements 26. At this time, a substantially elliptic vibration of an arbitrary shape can be generated in the stacked piezoelectric elements 26 by adjusting an amplitude and a phase of the voltage to be applied to the piezoelectric elements 21a and 21b.

FIGS. 4A-4C show the relationship between a displacement width (amplitude) Ux of the elastic member 22 in the X-direction and a displacement speed Vx of the stacked piezoelectric elements 26 in the X-direction to be given by the vibration of the elastic member 22, and also show an application timing chart of a rectangular wave to be applied to the stacked piezoelectric elements 26. Uy denotes a displacement width (amplitude) of the stacked piezoelectric elements 26 in the Y-direction. Vr denotes a rotating speed of the movable member 31. It is assumed that the movable member 31 is rotated under a substantially steady rotational condition at the constant speed of Vr=VR (i.e., steady state). In this case, when the displacement width Ux of the elastic member 22 tends to increase, and the displacement speed Vx of the stacked piezoelectric elements 26 is substantially equal to the rotating speed Vr ($\approx$VR) of the movable member 31, the sine wave AC voltage to the stacked piezoelectric elements 26 is discontinued, and a rectangular wave excitation signal is input to the stacked piezoelectric elements 26 (Point A in FIG. 4B). Accordingly, the stacked piezoelectric elements 26 are expanded in the floating direction of the movable member 31. Further, as the displacement width Ux of the elastic member 22 tends to increase, a shearing strain is generated in the stacked piezoelectric elements 26 to thereby accelerate the movable member 31 (Point B in FIG. 4B). As the acceleration of the movable member 31 proceeds, the displacement speed Vx of the stacked piezoelectric elements 26 is reduced (Points C and D in FIG. 4B). Thereafter, when the rectangular wave signal is cut off, the strain is eliminated (Point E in FIG. 4B). As a result, the accelerated condition of the movable member 31 is changed into a substantially constant speed condition. The same motion as above is repeated at the timing when the rectangular wave excitation signal is input again. FIGS. 5A to 5E show various conditions of the elastic member 22, the stacked piezoelectric elements 26 and the movable member 31 at the points A to E shown in FIG. 4B, respectively. A duty ratio t1/t2 is set so that the rectangular wave signal is input in the period between the point A and the point E.

Such a dynamic control makes it possible to transmit all the strain energy stored in the stacked piezoelectric elements 26 to the movable member 31, thereby greatly reducing a loss at a sliding portion between the piezoelectric elements 26 and the movable member 31.

As described above, the ultrasonic wave motor 11 is provided with the stacked piezoelectric elements 26 as an excitation source, and employs a substantially rectangular wave as an excitation signal for floating the movable member 31. Therefore, the sliding of the frictional surfaces between the piezoelectric elements 26 and the movable member 31 can be greatly reduced to thereby improve responsiveness and efficiency of the ultrasonic wave motor.

Further, a duty ratio of the standing wave in the floating direction is controlled by the control circuit 43. When the displacement speed of the stacked piezoelectric elements 26 becomes substantially equal to the rotating speed of the movable member 31, the former comes into contact with the latter, while when the shearing strain near the contact surface between the former and the latter is substantially eliminated, the former separates from the latter. Therefore, the strain energy stored in the stacked piezoelectric elements 26 is entirely transmitted to the movable member 31, thereby greatly reducing a loss at the sliding portion.

The present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein. For instance, although the above preferred embodiment utilizes a torsional vibration to be generated by the ultrasonic wave vibrator, various other vibrations such as vertical vibration, bending vibration or shearing vibration may be utilized. Further, a higher mode may be utilized.

Although the piezoelectric elements are employed as the excitation source for the elastic members in the above preferred embodiment, any other elements capable of converting electrical energy into mechanical energy, e.g., an electrostrictive element or a magnetostrictive element may be used. Further, the shape of the elastic members and the movable member is not limited to a circular shape, but any other shapes such as a planar, annular, rod-like or rectangular shapes may be employed.

I claim:

1. An ultrasonic wave motor comprising:
   an elastic member;
   a movable member;
   a first electrical/mechanical energy converting member for applying to said elastic member a vibration in a moving direction of said movable member;
   a second electrical/mechanical energy converting member interposed between said elastic member and said movable member for applying to said movable member a vibration in a floating direction of said movable member;
   a driving source comprising means for selectively applying a rectangular wave excitation signal to said second electrical mechanical energy converting member; and
   control means for controlling a duty ratio of the rectangular wave excitation signal, and for controlling said driving source so that the rectangular wave excitation signal is applied from said driving source to said second electrical/mechanical energy converting member, said control means operating to bring said second electrical/mechanical energy converting member into contact with said movable member, when a displacement width of said elastic member increases and a displacement speed of said second electrical/mechanical energy converting member is substantially equal to a rotating speed of said movable member, and to separate said second electrical/mechanical energy converting member from said movable member, when the displacement width of said elastic member decreases and the displacement speed of said second electrical/mechanical energy converting member is substantially equal to the rotating speed of said movable member.

2. The ultrasonic wave motor according to claim 1, wherein said second electrical/mechanical energy converting member comprises a stacked piezoelectric element.

3. The ultrasonic wave motor according to claim 1, wherein said second electrical/mechanical energy converting member comprises a stacked piezoelectric element.

4. The ultrasonic wave motor according to claim 1, wherein said movable member comprises a rotating disk, and said second electrical/mechanical energy converting member is adapted to contact a lower surface of said movable member near an outer periphery thereof, and said first electrical/mechanical energy converting member applies the vibration to said elastic member in a rotating direction of said movable member.

5. The ultrasonic wavemotor according to claim 4, wherein said second electrical/mechanical energy converting member comprises a stacked piezoelectric element.

6. The ultrasonic wave motor according to claim 1, wherein said driving source further comprises:
   means for applying a sine wave excitation signal to said second electrical/mechanical energy converting member; and
   means for selecting one of said sine wave excitation signal and said rectangular wave excitation signal so that said sine wave excitation signal is applied until said movable member is moved to reach a steady state, while said rectangular wave excitation signal is applied after the steady state.

7. The ultrasonic wave motor according to claim 6, wherein said second electrical/mechanical energy converting member comprises a stacked piezoelectric element.

8. The ultrasonic wave motor according to claim 6, wherein said second electrical/mechanical energy converting member comprises a stacked piezoelectric element.

9. The ultrasonic wave motor according to claim 6, wherein said movable member comprises a rotating disk, and said second electrical/mechanical energy converting member is adapted to contact a lower surface of said movable member near an outer periphery thereof, and said first electrical/mechanical energy converting member applies the vibration to said elastic member in a rotating direction of said movable member.

10. The ultrasonic wave motor according to claim 9, wherein said second electrical/mechanical energy converting member comprises a stacked piezoelectric element.

* * * * *